Figure 1:
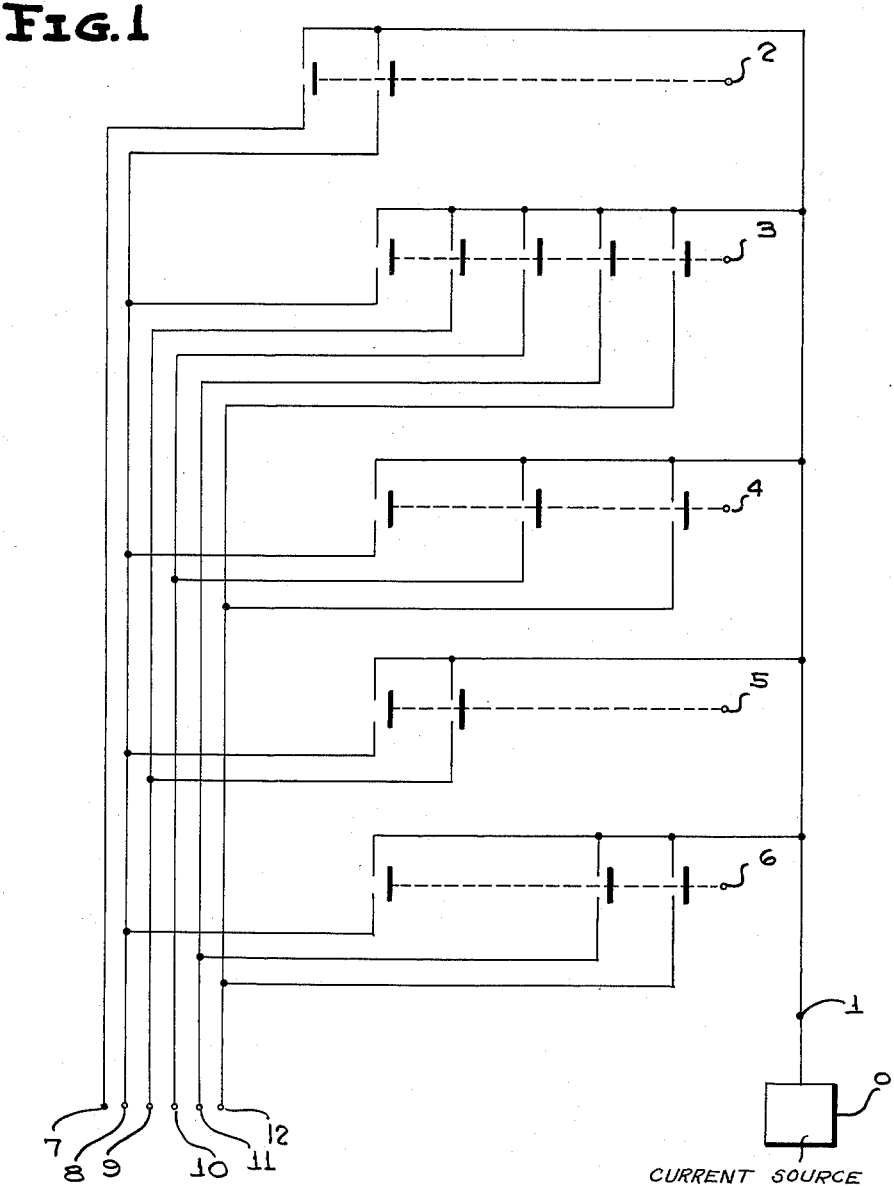

Sept. 3, 1963 L. PÉRAS 3,102,921
MULTI-CHANNEL SPECTRAL ANALYZER WITH INTERNAL
STANDARD CONTROL OF LIGHT INTEGRATION PERIOD
Filed Dec. 19, 1958 7 Sheets-Sheet 1

INVENTOR
LUCIEN PÉRAS

BY Stevens, Davis, Miller & Mosher
ATTORNEYS

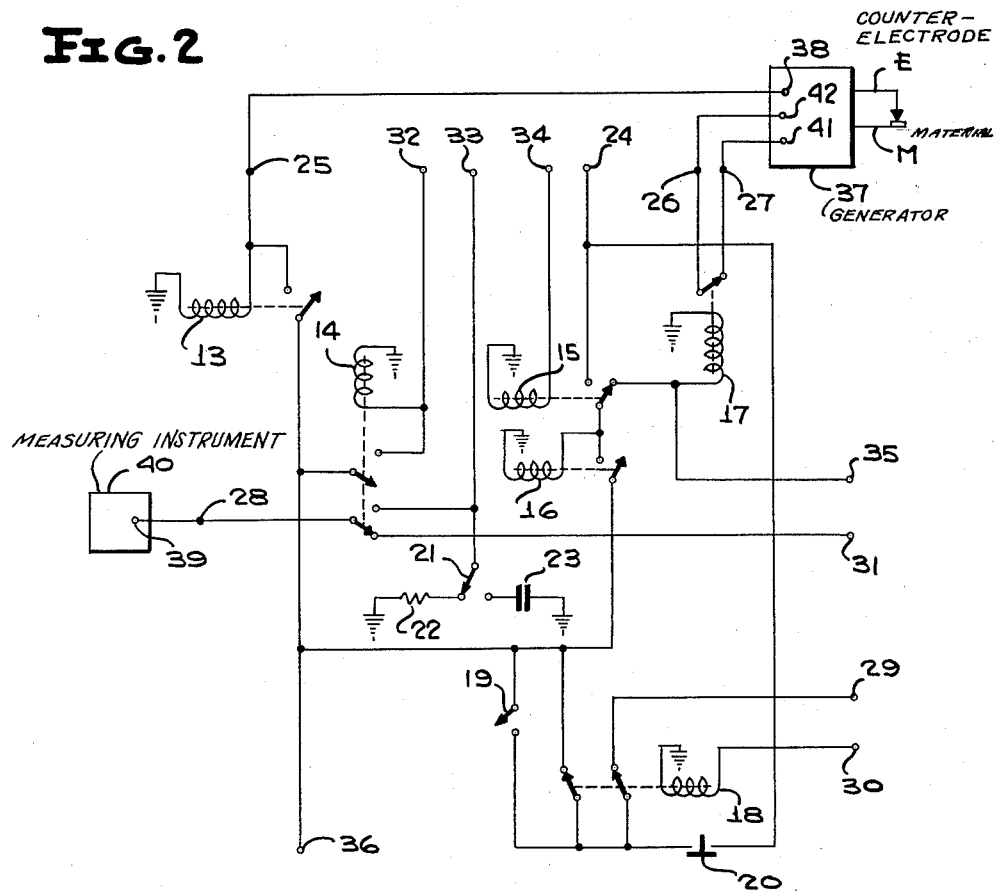
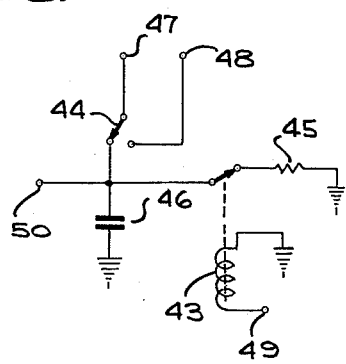
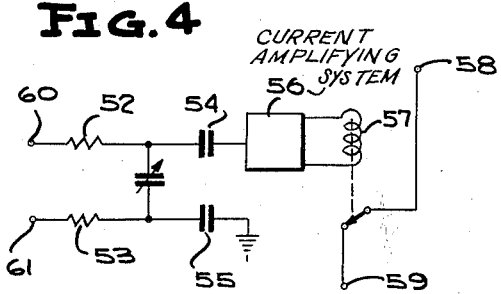
INVENTOR
LUCIEN PÉRAS

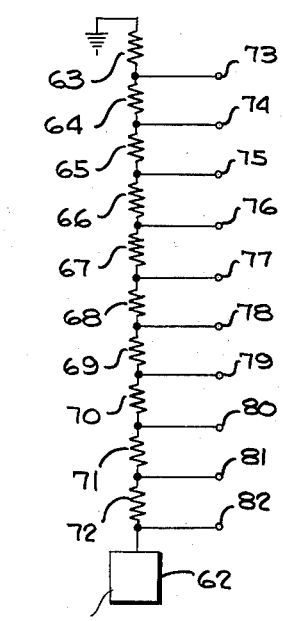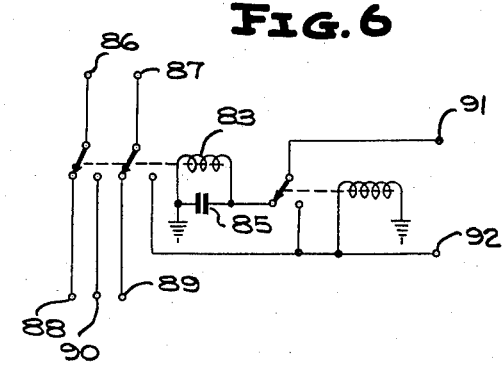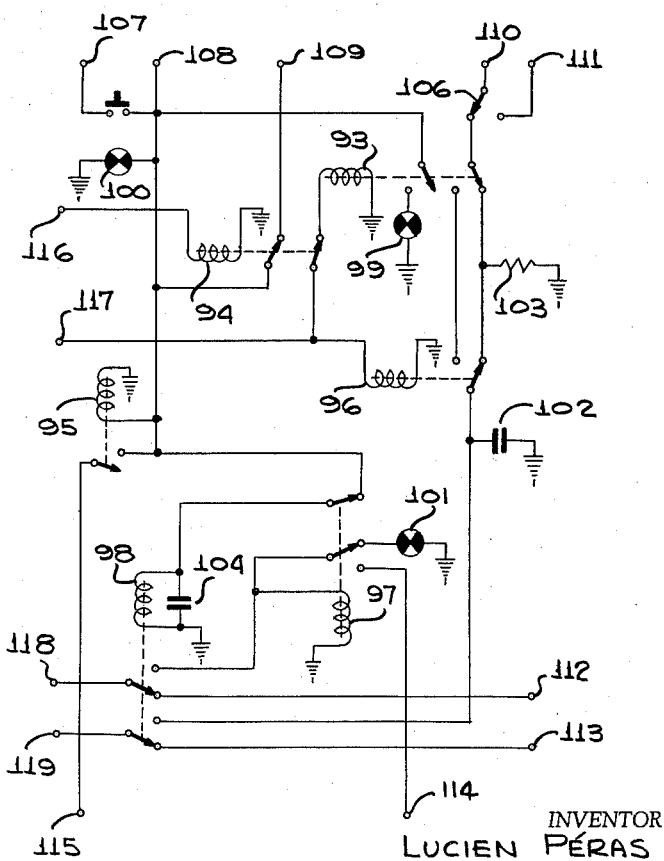

INVENTOR
LUCIEN PÉRAS

BY Stevens, Davis, Miller & Mosher
ATTORNEYS

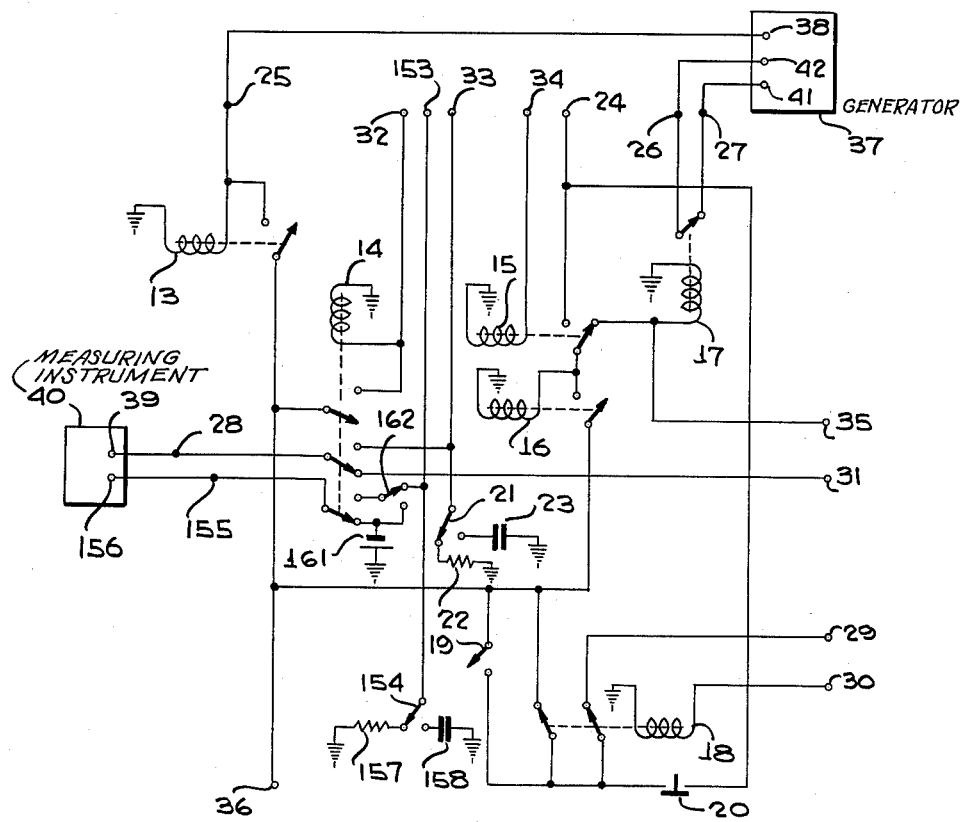

United States Patent Office 3,102,921
Patented Sept. 3, 1963

3,102,921
MULTI-CHANNEL SPECTRAL ANALYZER WITH INTERNAL STANDARD CONTROL OF LIGHT INTEGRATION PERIOD
Lucien Péras, Billancourt, France, assignor to Regie Nationale des Usines Renault, Billancourt, France, a French works
Filed Dec. 19, 1958, Ser. No. 781,628
Claims priority, application France Dec. 21, 1957
6 Claims. (Cl. 88—14)

Spectral processes are used in conjunction with chemical processes for analytical purposes. In these processes an excitation generator delivering a voltage fed across two electrodes is used, at least one of these electrodes consisting of the material to be analysed, so as to strike an arc or a spark between these electrodes. The spectrum of the light thus emitted is formed by means of an adequate optical system; then the photographic or photoelectric measurement of the intensity of the different spectrum lines is effected; from these measurements, the concentrations of the chemical elements of the material thus analysed are finally calculated.

Photoelectric spectrum-receiving devices are known wherein each selected spectral line isolated by means of a slit is radiated onto an electron photomultiplying cell. In devices of this character, there is selected, for each chemical element of which the proportions are to be determined, at least one characteristic line of this element, plus different radiations adapted to act as reference magnitudes (internal standards) consisting of either a characteristic lines of the major chemical element in the substance being analysed, or one fraction of the aggregate radiation resulting from the excitation.

Multi-channel electromechanical devices are also known wherein there is associated with each electron photomultiplying cell an integrating channel delivering a voltage proportional to the integral of the photocurrent for a certain time interval during the excitation, and wherein the integration voltages corresponding to the internal standards serve as reference magnitudes for measuring the integration voltages corresponding to the elements to be proportioned. Now the present invention is concerned with a device of this specific character.

In nearly all known devices of this type several analysis schedules or programs are contemplated and in each schedule comprising a plurality of channels the integration interval is the same for all channels and a same internal standard is chosen for all the elements of which the proportions are to be determined. As the spectral lines follow a different evolution during the excitation, it is advantageous, in the same analysis schedule, to adopt different integration intervals and different integral standards, independently for the different elements to be determined. It is the chief object of this invention to provide novel means adapted to carry into effect this twofold possibility. In addition, the device contemplated herein is so arranged that the analysis operations are effected in a substantially automatic way.

Moreover, with the apparatus of this invention, the "specific examination" of a line may be effected. This examination may be carried out either by measuring the output of a photocell or by measuring the integral of this output as a function of time.

This invention is also concerned with a substantial improvement in the apparatus broadly described hereinabove, which permits the specific examination of a pair of spectrum lines, that is, the study of the changes in the intensity ratio of any pair of spectrum lines or the study of the ratio of the intensity integrals of any desired pair of spectrum lines.

In order to afford a clearer understanding of this invention and of the manner in which the same may be carried out in the practice, reference will now be made to the accompanying drawings forming part of this specification and illustrating diagrammatically by way of example a few typical forms of embodiment of the invention.

Figure 8:
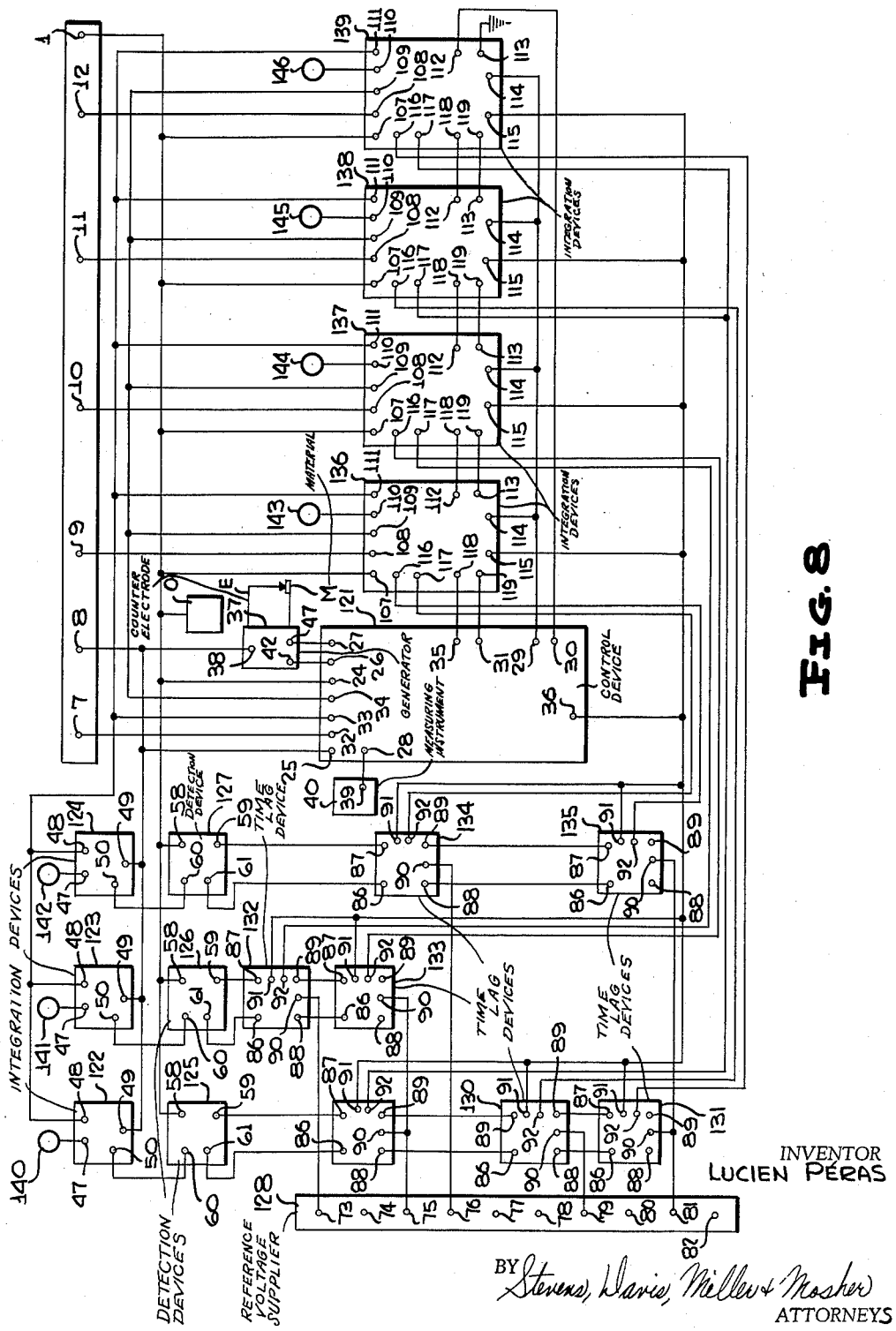
Figure 12:
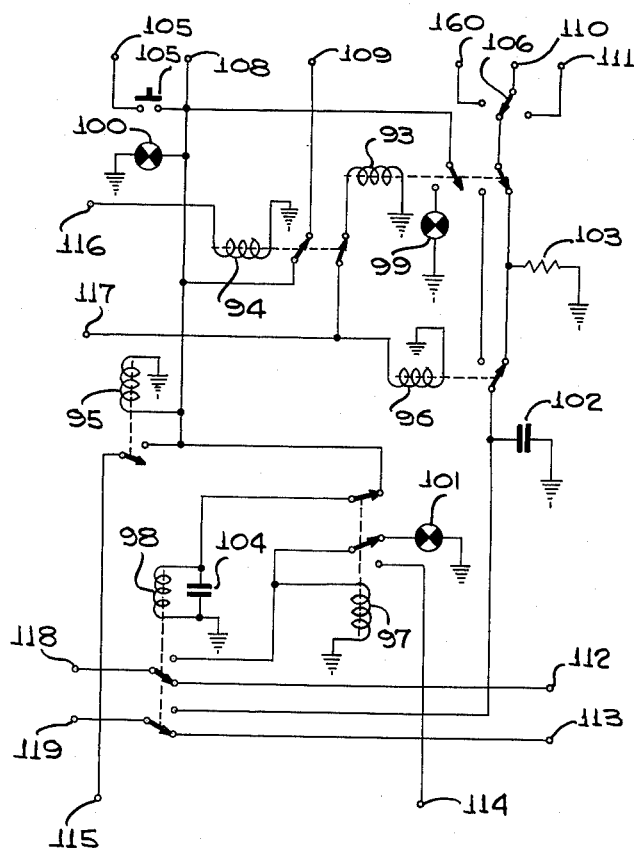
Figure 13:
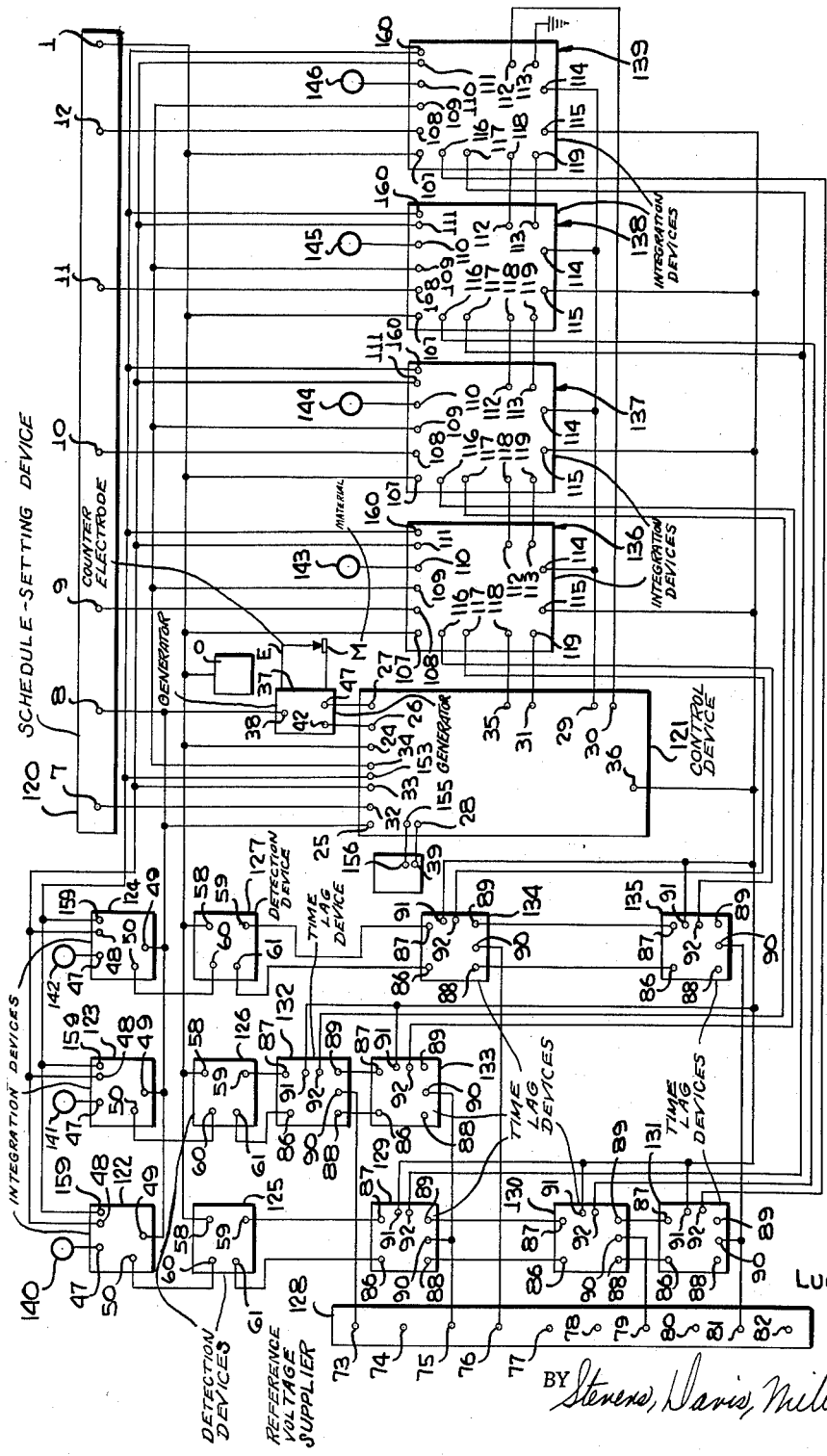

In the drawings:
FIGURE 1 is a diagram illustrating a schedule-setting device;
FIGURE 2 is a wiring diagram of a control device;
FIGURE 3 is wiring diagram of a device for integrating an internal standard;
FIGURE 4 is a wiring diagram of a detector;
FIGURE 5 is a wiring diagram of a device for delivering reference voltages;
FIGURE 6 is a wiring diagram showing a typical time-lag device;
FIGURE 7 is a wiring diagram showing an integration device for an element whose proportions to be determined;
FIGURE 8 is a block diagram of the devices shown in the preceding figures;
FIGURE 9 shows the wiring diagram of a control device of a modified form of embodiment of the invention;
FIGURE 10 shows the wiring diagram of an integration device for an internal standard in the same modified form of embodiment;
FIGURE 11 shows a block diagram of a modified detector device;
FIGURE 12 is a wiring diagram of an integration device for an element whose proportions are to be determined, according to the same modified form of embodiment; and
FIGURE 13 illustrates the general block diagram of this modified form of embodiment of the invention.

The apparatus according to a first form of embodiment of this invention, comprises a number of devices associated with one another and described in succession hereafter with reference to FIGURES 1 to 7 of the drawings. Their different interconnections with a view to obtain the desired result are illustrated in FIGURE 8 and will be subsequently described with reference to this figure.

Generally speaking, for the purposes of spectral analysis, the apparatus shown in FIGURE 8 comprises the various constituent devices specified below:
A source O of direct-current;
An excitation generator 37, which acts on the material M to be analyzed;
Photo-multiplier cells 143, 144, 145, and 146, intended to receive the radiations from the elements to be evaluated;
Photo-multiplier cells 140, 141 and 142, intended to receive the radiations of the rays selected as internal standards, that is to say as comparison elements;
A schedule-setting device 120 which permits of selection from a series of analyzes corresponding to previously-prepared circuits, each of these analyzes relating either to a series of rays or to a particular ray, the examination of which is effected by measuring the output of the corresponding cell or by measuring the integral of this output as a function of time;
A series of integration devices 136, 137, 138 and 139, for elements to be evaluated, receiving the outputs of the photo-multiplier cells corresponding to the elements to be evaluated;
A series of integration devices 122, 123, and 124, for an internal-standard, said devices receiving respectively the outputs of the internal-standard photo-cells;
Detection devices 125, 126 and 127, receiving the voltages derived from the internal-standard integration devices and intended for comparing said voltages with reference voltages;
A device for supplying reference voltages 128, which supplies reference voltages of stepped values permitting the choice of integration intervals which are different for different elements to be analyzed simultaneously;

Time-lag devices 129—135, which receive said reference voltages, said devices being associated in series, one series for each detection apparatus; they have the function of triggering the beginning and the end of the integration operations for the currents of photo-cells of elements to be evaluated, this taking place when the voltage supplied by the integrators of the currents of the internal-standard photo-cells have reached predetermined values;

A control device 121 establishes the currents in the excitation generator and automatically initiates and terminates the operations of integration or measurement of the currents of elements to be evaluated, according to the impulse supplied by the time-lag devices; it finally releases the operation of a measuring instrument 40 which supplies the desired indication, for example by comparison of the integrator devices with each other or by direct reading of the currents supplied by the photocells.

The various constituent parts shown in FIGURES 1 to 7 will now be analyzed in a more detailed manner.

*Schedule Setting Device—(FIGURE 1)*

This device is connected at 1 to a source O supplying current to relay means (for example a 24-volt D.C. source) and comprises a plurality of multi-circuit push-buttons 2, 3, 4, 5, 6, . . . etc., and different terminals or points 7, 8, 9, 10, 11, 12 . . . etc., connected as follows: When the push-button 2 is depressed, the source O is connected to terminals 7 and 8; when one of the push-buttons 3, 4, 5, 6, etc. . . ., is depressed, the source O is then connected to the terminal 8, and according to the selected push-button, this source is also connected to terminals 9, 10, 11, 12, etc. . . . (thus, in the case illustrated in FIG. 1, when the operator depresses the push-button 3, the source O is connected to terminals 8, 9, 10, 11 and 12; if he depresses the push-button 4, terminals 8, 10 and 12 are connected; in the case of push-button 5, terminals 8 and 9 are energized, and if 6 is depressed, terminals 8, 11 and 12 are energized).

As will be explained below, the terminal 7 is connected to the control device 121, the terminal 8 to the excitation generator, each of the terminals 9, 10, 11 and 12, respectively, to an integration device of an element to be evaluated.

According to the selected push-button, it is possible to carry out either the analysis of different elements of which the quantities or proportions are to be determined according to a predetermined schedule (for example, push-buttons 3, 4, 5, 6) or the specific examination of one of these elements (push-button 2).

*Control Device (FIGURE 2)*

This device comprises relays 13, 14, 15, 16, 17 and 18; a switch 19; a push-button contact 20; a two-way switch 21; a resistor 22 (for example a 20-megohm resistor); a capacitor 23 (for example a 1 μf. capacitor), and different terminals 24, 25, 26, 27, 28, 29, 30, 31, 32, 33, 34, 35 and 36.

Terminal 24 is connected externally of the control device to the aforesaid source of current O, so that, by means of the contact 18b, the contacts of the relay 13 and 16 and terminal 36 are constantly under tension.

Terminal 25 is connected also externally of the control device to terminal 8 of the aforesaid schedule setting device and in an excitation generator 37 to a terminal 38 controlling the establishment of the excitation, that is, the production of an arc or spark between the material or substance M to be analysed and the counter-electrode E. When any one of the push-buttons 2, 3, 4, 5, 6, etc. . . . of the schedule setting device is depressed, a pulse is transmitted by terminal 8 to terminal 25.

Relay 13 is energized and its front contact closed. Due to the holding circuit of this relay (not shown) terminal 25 becomes energized by the required voltage from terminal 24 and the contacts 20 and 18b and the excitation of an arc or a spark is established by the generator 37 on the material to be analysed M.

Terminal 28 is connected externally of the control device to the inlet 39 of a device 40 comprising a D.C. amplifying system for impedance matching purposes and a fast-operating recording voltmeter or potentiometer for voltage measurements. As the relay 14 is not energized, the terminal 28 is connected through the back contact of this relay to terminal 31.

Terminal 32 is connected also externally of the control device to the terminal 7 of the schedule setting device. If the operator depresses the "special-examination" push-button 2 of this schedule setting device, a pulse is transmitted to terminal 32. Under these conditions, relay 14 becomes energised and is maintained in this position by its holding circuit. Terminal 28 is then connected to terminal 33 instead of terminal 31 and to resistor 22 or capacitor 23, according to the position occupied by the two-way switch 21.

Externally of the control device, the terminal 34 is energized when the excitation is established, and this voltage is discontinued at the requisite moment for interrupting the excitation as will be explained later. When terminal 34 is energized through one of the controls 3, 4, 5 or 6, relay 15 becomes operative and relay 16 is also energized. When the supply of current to 34 is discontinued, relay 15 resumes its inoperative position (in which it is shown) but relay 16 remains energized from 24—20, and terminal 35 is energized, thereby energizing relay 17 and breaking the hitherto short-circuited connection between terminals 26 and 27. These terminals are connected externally of the control device and in generator 37 to terminals 41 and 42 of a special circuit permitting when short-circuited the operation under excitation conditions; thus, when the voltage is discontinued at 34, the excitation is ended.

Externally of the control device, the terminal 30 is energized at the proper moment to end an analysis. When terminal 30 is energized and due to the operation relay 18, the voltage is momentarily discontinued in terminals 29 and 36, and, due to their holding circuits the relays 13, 14, 16 and 17 resume their inoperative or de-energized condition. The same result may be obtained prematurely by depressing the push-button 20. If switch 19 is closed, the energization of terminal 30 or the depression of push-button 20 will provide no other effect than momentarily discontinuing the supply of voltage to 29.

If the measurement made relates to the examination of a particular ray, terminal 32 is momentarily put under tension by the action on contact 2, which energizes the relay 14, the latter remaining in the working position by self-energization. This relay acts on a contact which puts the terminal 39 of the measuring instrument 40 in connection with the conductor coupling the terminal 33 with one or the other of the impedances 22 or 23, the selection of which is made by the change-over switch 21.

*Integration Device for Internal Standard (FIGURE 3)*

This device comprises a relay 43, a reversing switch 44, a resistor 45 (for example a 1.000-megohm resistor), a capacitor 46 (for example a 1 μf. capacitor) and different terminals 47, 48, 49 and 50.

This device is associated with a cell for photomultiplying the internal standard electrons. The terminal 47 is connected to the anode circuit of this cell.

The terminal 48 is connected externally of the device contemplated herein to the terminal 33 of the control device. Assuming the two-way switch 44 to be in the position opposite to that in which it is shown in FIGURE 3, when the operator depresses the push-button 2 of the schedule setting device the electron photomultiplying cell connected to 47 will deliver a voltage to resistor 22 or to capacitor 23 of the control device.

The terminal 49 is connected externally of the device contemplated herein to the terminal 25 of the control device. When any one of the push-buttons 2, 3, 4, 5, 6, etc. . . ., in the schedule setting device is depressed, the relay 43 becomes energized and breaks the short-circuiting of capacitor 46 by resistor 45. Assuming that the reversing switch 44 is in the position shown in FIGURE 3, the electron photomultiplying cell connected to terminal 47 will deliver current to capacitor 46 and the potential of this charged capacitor will appear at terminal 50.

*Detector (FIGURE 4)*

This device comprises a modulation system consisting of a vibrating-plate capacitor 51, two resistors 52, 53 and two capacitors 54, 55; an A.C. current amplifying system 56, a relay 57, and different terminals 58, 59, 60 and 61.

This device is associated with an internal standard integration device. The terminal 60 is connected externally of the device to the terminal 50 of the associated integration device and receives the potential across the capacitor 46 of this device.

The terminal 61 is connected externally and in a manner to be described presently to a system providing a continuous reference voltage.

The potential of the charged capacitor fed to 60 is opposed to the reference voltage fed to 61, so that a continuous difference signal appears between the terminals 60 and 61. This signal is fed to the input of a modulation system consisting of resistors 52, 53 (for example 1-megohm resistors), of the vibrating plate capacitor 51 (for example a 10-microfarad capacitor modulated by a 400-cycle oscillator) and of capacitors 54, 55 (for example 10,000 microfarad capacitors). The thus modulated difference signal is amplified and rectified by the A.C. amplifier 56 and energizes the relay 57.

The terminal 58 is connected to the current source O. Through the relay 57 the terminal 59 is momentarily energized when the difference signal is zero, that is when the charging voltage applied to 60 equals the reference voltage fed to 61.

*Reference-Voltage Supply Device (FIGURE 5)*

This device comprises means 62 for delivering a continuous stabilized voltage, a voltage divider having a number of resistors 63, 64, 65, 66, 67, 68, 69, 70, 71, 72 and terminals 73, 74, 75, 76, 77, 78, 79, 80, 81 and 82.

Thus, if the supply delivers one volt and the voltage divider comprises ten stages, the voltages at terminals 73, 74, 75 . . . 82 are .1 volt, .2 volt, .3 volt . . . 1 volt, respectively.

*Time-Lag Device (FIGURE 6)*

This device comprises relay 83, 84, a capacitor 85 and terminals 86, 87, 88, 89, 90, 91, 92.

As will be explained presently a detector has associated therewith a series of time-lag devices wherein the terminals 86 and 87 of the first one are connected to the terminals 61 and 59 of the detector, respectively, and terminals 86 and 87 of the following devices are connected to the terminals 88 and 89 of the preceding device in the series, respectively. On the other hand, each time-lag device has its terminal 91 connected to the terminal 36 of the control device. Consequently, this terminal 91 is normally energized with a voltage broken momentarily at the end of the analysis, and the relay 83 is normally in its energized position.

In the first time-lag device of the series the reference voltage at terminal 73 of the supply device (for example .1 volt) is transmitted from terminal 90 to terminal 86 through the medium of the first contact of relay 83 normally energized. This voltage fed to terminal 61 of the detector is in opposition with the charging voltage fed to 60. When, as the charging voltage increases, the voltages at 60 and 61 balance each other, terminal 87 is momentarily energized; through the medium of the second contact of relay 83 normally energized, the other relay 84 becomes operative and is held in this condition; terminal 92 becomes momentarily energized; relay 83 resumes its inoperative condition due to the contact of relay 84 breaking the circuit feeding the winding of relay 83. A capacitor 85 is provided on the same winding of relay 83 for retarding the passage of this relay to its inoperative position, and providing a sufficient time for the passage of relay 84 to its operative position. Under these conditions, owing to the circuitry of relay 83, the second time-lag device of the series takes the position which was taken initially by the first one, terminals 86 and 87 being connected respectively to terminals 61 and 59 of the detector. When the increasing charging voltage at 60 in the detector balances the reference voltage at 74 in the supply device (for example at .2 volt), terminal 92 of the second time-lag device becomes energized and the third time-lag device becomes operative, and so forth.

As the time-lag devices operate in cascade, the terminals 92 of these devices are successively energized as the increasing charging voltage at 60 in the detector will successively balance the reference voltages at 73, 74 . . . 82 in the supply device. The cascade operation of the series of the time-lag devices remains satisfactory even if this series of devices were incomplete and comprised for example only three devices having their terminals 90 connected to the terminals 75, 79 and 81 of the supply device.

*Integration Device for Element to be Proportioned (FIGURE 7)*

This device comprises relays 93, 94, 95, 96, 97 and 98, pilot lamps 99, 100, 101, a capacitor 102 (for example a 1 μf. capacitor), a resistor 103 (for example a 1,000-ohm resistor), a capacitor 104, a push-button switch 105, a two-way switch 106, and terminals 107 to 119.

This device is associated with a cell for photomultiplying the electrons from the elements whose proportions are to be determined. The terminal 110 is connected to the anode circuit of this cell.

It will be assumed in the description which follows that the switch 105 is in the position shown in FIGURE 7.

The terminal 108 is connected to one of the aforesaid terminals 9, 10, 11, 12 of the schedule setting device. When one of the push-buttons 3, 4, 5, 6 of the schedule setting device is depressed and provided that a circuit corresponding to one of the terminals 9, 10, 11 or 12 connected to the integration device is associated with this push-button, a pulse is transmitted to terminal 108.

Terminal 115 is connected to terminal 36 of the control device. Due to the operation of relay 95, the voltage at terminal 108 is maintained. The pilot-lamp 100 is lighted. Relay 98 is in its operative position. Thus the integrator is in its pre-set condition.

Terminals 116 and 117 are connected to terminals 92 of two time-lag devices of the same series (these devices being associated with the same detector). Of these two time-lag devices, the one connected to terminal 117 is positioned in the series before the one connected to terminal 116. Due to the time-lag thus introduced, terminal 117 is energized at a given moment and at a later moment it is the terminal 116 that becomes energized.

When terminal 117 becomes energized, relays 96 and 93 are also energized and the pilot lamp 99 is lighted. The electron photomultiplying cell connected at 110 and the capacitor 102 are disconnected from resistor 103 and the cell delivers current to capacitor 102.

When terminal 116 is energized, relay 94 becomes operative and the circuit of terminal 109 is broken. Relay 93 resumes its inoperative position and the pilot lamp 99 is out. The photomultiplying cell connected to terminal 110 delivers again voltage to resistor 103 and the charged capacitor 102 is isolated.

A chain of integration devices of this type are provided; each integration device is associated with the different cells for photomultiplying the electrons of the elements to be analysed or proportioned. In this chain, terminals 118 and 119 of the first device of this character are connected to terminals 35 and 31 of the control device, respectively, and terminals 118 and 119 of the other devices are connected to terminals 112 and 113 of the preceding device in the chain. Terminal 113 of the first device in the chain is earthed, and terminal 112 of the same device is connected to terminal 30 of the control device.

If we consider the first integration device of the chain and assuming that the operator has depressed in the schedule setting device a push-button such that terminal 108 of the integration device in question has become energized, the relay 98 will become operative and during the energizing period the increasing charging voltage of capacitor 102 is transmitted through terminal 119 connected to terminal 31 of the control device to the measuring instrument 40. When the energization is discontinued the terminal 118 of the integration device which is connected to the terminal 35 of the control device becomes energized. The pilot lamp 101 is lighted, and relay 97 is energized. A time-lag device is provided in this relay which becomes operative in the energized condition of the relay (for example with a 2- or 1-second lag). During this time period the measuring instrument 40 indicates the value of the measured charging voltage of capacitor 102. Beyond this time-period, relay 97 remains in its operative condition.

Terminal 114 is connected to terminal 29 of the control device to maintain this relay 97 in its operative condition. The pilot-lamp 101 is extinguished and relay 98 resumes its inoperative condition. A connection is established between terminals 118 and 112, on the one hand, and terminals 119 and 113, on the other hand. A capacitor 104 is provided on the energizing winding of relay 98 in order to retard the passage of this realy to its inoperative condition and to provide a time-lag sufficient to enable the other relay 97 to become operative.

Thus, the second integration device of the chain will be placed in the initial conditions of the first one, and terminals 118 and 119 are connected to terminals 35 and 31 of the control device. The device 40 indicates the measure of the charging voltage of capacitor 102 of the second integration device, then of the third one, and so forth, these devices operating in cascade.

Assuming that in the schedule setting device, the operator has depressed a push-button such that the terminal 108 of an integration device has not been energized. In this device, the energization of terminals 117 and 116 will not be attended by any effect. The pilot lamps 100 and 99 remain out, capacitor 102 and the cell connected at 110 will remain earthed through resistor 103. On the other hand, relay 98 will remain inoperative (and the pilot lamp 101 switched off) whereby this device will transmit through the connections of terminals 118 and 112 the voltage available at 35 from the preceding device to the following one and through the connections of terminals 119 and 113, the charging voltage of the following device of this chain with the measuring instrument 40. The device concerned takes no part in the charging voltage measurements but provides the necessary relay in the chains of integration devices.

Terminal 107 is connected to the supply source O. An integration device for an element to be proportioned may be preset, that is, prepared to accomplish its integrating function and included in the cycle of measurements of the charging voltage, by utilizing the pushbutton 105 of this device instead of one of the push-buttons 3, 4, 5 and 6 of the schedule setting device.

When all the integration devices inserted in the schedule have received through their terminal 116 an "end of integration" order, the voltage at terminals 109 of all the integration devices is zero and the de-energization of the terminal 34 of the control device which is connected to the terminals 109 of all the integration devices will break the enregization and establish the cycle during which the charging voltages of capacitors 102 of the channels inserted in the schedule are measured.

When all the scheduled integration devices have passed through the measurement cycle, the inlet 39 of the measuring device 40 is earthed through the terminal 113 of the last integration device of the chain, and the energization of terminal 30 of the control device which is connected to terminal 112 of the last integration device of the chain will cause, by opening the holding circuits of the different relays concerned, the apparatus to resume its inoperative condition. However, should the switch 19 of the control device be placed in its closed position, so as to maintain the terminal 36 alive, the apparatus will not resume its initial or inoperative condition. As the supply of current to terminal 29 is momentarily discontinued, the relays 97 of the integration devices will resume their inoperative condition and relays 98 will become operative, and the cycle of measurement of the charging voltages will take place again and again as long as switch 19 is left in its circuit-closing position.

If it is now assumed that the change-over switch 106 is placed in the position opposite to that shown in FIGURE 7, the terminal 110 is connected to the terminal 111 and, from the moment when the push-button 2 of the schedule-setting device is depressed, the cell connected to 110 delivers its output to the resistance 22 or to the capacitor 23 of the control device.

*Operation*

It will be recalled that the apparatus comprises the following control members:

Various push-buttons for setting the schedule, i.e. a push-button 2 for specific examinations; other push-buttons 3, 4, 5, 6 for different analysis (FIG. 1).

A push-button 20 for resetting the apparatus (FIG. 2).

A two-way switch 19 for repeating the measurement cycle (the repetition position of the measurement cycle is the opposite to that shown in FIG. 2).

A two-way switch 21 for selecting the impedance in a specific examination (the resistor being in the position shown in FIG. 2 but the capacitor being in the reverse position).

For each internal standard and for each element to be evaluated there is a two-way switch 44 or 106 for specific examination (the specific examination position is the opposite to that shown in FIGS. 3 and 7).

For each element to be evaluated, a push-button 105 for any addition to the schedule (FIG. 7).

Different pilot-lamps are also provided in the apparatus for each element to be proportioned:

One pilot-lamp 100 indicating the setting of the schedule;

One pilot-lamp 99 indicating the integration period, and

One pilot-lamp 101 indicating the measurement period.

To effect the analysis of a substance or material, the operator depresses the schedule setting push-button 3, 4, or 5, etc . . ., according to the desired schedule or programme. The schedule indicator pilot-lamps 100 indicate the selected programme or schedule. During the energization, the integration pilot-lamps 99 indicate the integration period of the elements of the schedule. The energization is discontinued when the integration is completed for all the elements of the schedule. Then the apparatus provides the successive measurements of the charging voltages for all the elements of the schedule. The measurement pilot-lamps 101 indicate the measurement periods of the elements. Finally, the apparatus resumes its inoperative condition when the measurements have been made on all the elements of the schedule. All these operations take place automatically.

If desired, by depressing the push-button 105 of one or more channels, before depressing a schedule setting push-button (3 to 6), additional elements corresponding to the aforesaid channels are included in the schedule.

If desired, for checking purposes, the cycle-repetition switch 19 may be actuated before the measurements are completed, so that the measurement cycle will be repeated automatically until the same switch is restored to its normal position.

A specific examination may be effected which consists in measuring the output of a photomultiplying cell or of the integral of this output as a function of time during the energization. To effect this operation, the operator actuates the specific examination switch 44 or 106 corresponding to the selected cell; then the impedance selector switch 21 is placed in the desired position, and the specific examination push-button 2 is depressed.

During an analysis, the operator may interrupt all the operations in course and reset the apparatus to its inoperative condition by depressing the resetting push-button 20. The same procedure may be adhered to for completing a specific examination.

As already set forth hereinabove, an apparatus may be designed with a view to carry out the specific and comparative examination of a pair of spectrum lines. An apparatus of this type will now be described with reference more particularly to FIGS. 9 to 13 of the drawings.

This apparatus comprises, in its general aspect, the same component elements or devices as the apparatus described hereinabove; consequently, only the elements or devices bearing one or more modifications with respect to this first form of embodiment will now be described, these modifications being pointed out as they occur in the description.

Schedule Setting Device

This device is the same as the schedule setting device described with reference to FIG. 1. The push-member 2 will now be used—as will be explained presently—not only for the specific examination of a spectrum line, but also for the specific examination of a pair of spectrum lines.

Control Device

This device illustrated in FIG. 9 differs from the control device shown in FIG. 2 by the following points: it comprises, in addition, a two-way switch 162, a switch 154, a resistor 157 (for example a 20-megohm resistor), a capacitor 158 (for example a 1 μf. capacitor), a battery 161 (for example a 1-volt battery) and teminals 153 and 155.

Terminal 155 is connected externally of the control device to the input 156 of a device 40' comprising a two-way D.C. amplifier having an impedance-matching function, and a potentiometer-quotientmeter of the fast-operating recorder type.

When the operator depresses the push-button 2 of the schedule setting device, an electric pulse is transmitted to terminal 32. Relay 14 becomes operative and is maintained in this condition by its holding circuit. Terminal 28 is thus connected to terminal 33 and to resistor 22 or capacitor 23, according to the position in which the two-way switch 21 has been set. Similarly, the terminal 155 is connected according to the position of the two-way switch 162 either to the battery 161 or to terminal 153 and resistor 157 or to capacitor 158, according to the position of switch 154.

Integration Device for Internal Standard

This device illustrated in FIG. 10 differs from the internal standard integration device illustrated in FIG. 3 by the following points: it comprises in addition a terminal 159 and a three-way switch is substituted for the two-way switch 44.

Terminal 159 is connected externally of this device to terminal 153 of the control device.

Assuming that the switch 44 is set on one of the other two positions differing from that shown in FIG. 10, when the operator depresses the push-button 2 of the schedule setting device the photocell connected at 47 to the integration device for internal standard delivers a current either to resistor 22 or capacitor 23 of the control device, or to resistor 157 or capacitor 158 of the same device, according to the position of switch 44 of the integration device.

Detector

The possibility of utilizing the device illustrated in FIG. 11 is contemplated as a substitute for the detector described hereabove.

This modified device comprises a D.C. amplifier 147, an inverter 148, an A.C. amplifying system 56, a relay 57 and different terminals 58, 59, 60 and 61.

The difference signal appearing across terminals 60 and 61 is fed to the D.C. amplifier 147 and then transmitted to an inverter 148 (having for example a frequency of 4,000 cycles per second) followed by a thyratron A.C. amplifier 56 energizing the relay 57.

The terminal 58 is connected to the supply source O. Through the operation of relay 57, terminal 59 is momentarily energized when the error signal appearing across the terminals 50 and 61 is null.

Reference-Voltage Supply Device

In this modified form of embodiment of the apparatus the reference-voltage supply device is exactly the same as the corresponding one shown in FIG. 5.

Time-Lag Device

This device is the same as that shown in FIG. 6.

Integration Device for Element To Be Proportioned

This device shown in FIG. 12 differs from the integration device for elements to be proportioned which is illustrated in FIG. 7 by the following points: it comprises in addition a terminal 160 and the two-way switch 106 is replaced by a three-way switch.

Terminal 160 is connected to terminal 153 of the control device.

Assuming that switch 106 is in one of its two positions differing from that shown in FIG. 12, immediately as the operator depresses the push-button 2 of the schedule setting device the photocell connected at 110 to the integration device for elements to be proportioned delivers a current either to resistor 20 or capacitor 23 of the control device, or to resistor 157 or capacitor 158 of the same device, according to the position in which the switch 106 of the integration device for elements to be proportioned is set.

Interconnection of the Different Devices

FIGURE 13 illustrates by way of example a general or block diagram showing the wiring arrangement constituting the interconnections between the devices described in the preceding paragraphs. These interconnections differ from those of the first form of embodiment through the following points: they comprise, in addition, a connection between the terminals 155 of the control device and 156 of the measuring device 40. Moreover, terminals 159 of the integration devices for internal standard 122, 123, 124 and terminals 160 of the integration devices for the elements to be proportioned 136, 137, 138 and 139 are all connected in parallel to terminal 153 of control device 121.

The apparatus comprises in addition to the control members described with reference to the first form of embodiment a switch 162 disposed in the control device 121 and adapted to permit the specific examination of a line or a pair of lines at will. Moreover, the number of positions of the control members of switches 44 of the integration devices for internal standard and 106 of the integration devices for the elements to be proportioned is increased from 2 to 3 units in order to permit the specific examination not only of a line but of a pair of lines.

As already explained hereinabove, the same control members as in the previously described apparatus are utilized in this modified form of embodiment, except for the fact that for each internal standard and for each element to be proportioned the two-way switch permitting the specific examination of a line is replaced by a three-way switch permitting the specific examination of a pair of lines. The analysis of a material or substance is effected according to the same procedure as that described hereinbefore.

This procedure is therefore the same in the case of the specific examination of a single spectrum line, but it is possible to carry out the specific examination of a pair of spectrum lines. This can be done by simply setting the switch 106 for an element to be proportioned or 44 for an internal standard, of one of the two lines to be studied, in a position other than the position shown in FIG. 12 (or FIG. 10), and the switch 106 (or 44) of the other line to be studied in the other position differing from that shown in FIG. 12 (or FIG. 10). By depressing the push-button 2, the outputs of the photocells corresponding to the lines to be studied are delivered the one to the impedance connected at 21, the other to the impedance connected at 154, which have their terminals connected to the two channels of the measuring device 40.

The various modes of operation of the system will now be described in detail. This description will be described with reference to the embodiment of FIGS. 9–13. The operation of the embodiment of FIGS. 1–8 will be apparent from this description as the system of FIGS. 9–13 is a modification of the simpler system of FIGS. 1–8 using all of the circuitry of the system of FIGS. 1–8.

I—*Specific Examination of a Radiation or Characteristic Line*

The intensity of a radiation or characteristic line is studied as a function of time. The measured intensity may be either the instantaneous intensity or the integral of the intensity from moment O to moment P.

The operator sets the switching device 106 (FIG. 12) corresponding to the selected line in the position whereby 110 is connected to 111, all the other switches corresponding to the other lines remaining in their intermediate positions.

The photocurrent from the cell is directed to terminal 111 of the integrator and then fed to terminal 33 of the control device and also to switch 21 as shown in FIG. 9. If an integration is desired, it is directed to capacitor 23, and if it is desired to study the instantaneous intensity, 21 is placed on 22.

The function switch 162 in the control device (FIG. 9) is set in its lower position. When relay 14 is energized, it transmits a reference voltage from battery 161 to 155—156 and its second contact connects the conductor 33—21 to terminal 39. The recorder 40 records the measured voltage across the terminals of 23 or 22.

The operations are commenced by depressing the push button 2 of the control device (FIG. 1). The relay energizing current from the source O is fed to terminals 7 and 8. Terminal 7 is connected to the control terminal 32 feeding the relay 14 and the latter is energized immediately; the terminal 8 is connected on the one hand to the terminal 38 of the generator 37, so that the source of energizing current is started, and on the other hand to the control terminal 25, so that the relay 13 becomes energized (FIG. 9). Both relays 13 and 14 are held in their operative position by the voltage constantly present at terminal 24 of the control device applied through switch 20 and a contact of relay 18.

The operations may be stopped when desired either by depressing the push button 20 inserted in the holding circuit of the aforesaid relays, or manually, or by means of a timing switch (not shown).

II—*Specific Examination of a Pair of Radiations or Characteristic Lines*

The operator selects two lines. The switches 106 (FIG. 12) of the associated integrators are set the one in the left-hand position (way X), the other in the right-hand position (way Y).

The type of study is selected as before by actuating the switches 21 of way Y and 154 of way X (FIG. 9). On the other hand, the operating switch 162 is placed in its upper position (as shown) for the specific examination of a pair of lines. In this position the way X of the recorder is supplied not with the reference voltage as in the preceding case, but with the voltage taken across the terminals of the impedance selected through the actuation of switch 154.

The operations are started and stopped as in the preceding case. For the specific examination of a line or a pair of lines, one may select, of course, for each of the aforesaid ways X and Y, either the line of a future element to be measured, or the line of a future internal standard. In this second case the switch 47 (FIG. 10) of the selected internal-standard integrator device or devices has the same function as the switch 106 (FIG. 9) of the integrator devices for the elements to be measured.

III—*Industrial-Control Operation with Internal Standards*

(Measurement of the concentration of different elements in a given material).

The operation will be conducted on two lines, for example $S_i$ and $M_n$ in a steel assaying operation.

A preliminary study is effected involving the "specific examination" of the different lines of $S_i$ and $M_n$ led to select a certain line of $S_i$ and a certain line of $M_n$ as well as the internal standards consistent with the measurement of each of these lines, and the time-lag quantities.

(1) *Selection of a Program and Commencement of Operations*

The selection of a program and the commencement of the analytical operations are effected by actuating a single push-button (assuming a conventional, pre-established program), for example push-button 4 (FIG. 1), whereby a voltage pulse is fed from source O to terminals 8, 10 and 12 of the programming device.

Terminal 10 is connected to terminal 108 of integrator $S_i$.

Terminal 12 is connected to terminal 108 of integrator $M_n$.

The tell tale lamps 100 (FIG. 12) of these two integrators are energized (for checking purposes).

Connections adapted to be modified at will are provided between the terminals 116 and 117 of each integrator of the element to be analyzed and a pair of terminals 92 of two time-lag devices pertaining to a certain internal standard. These connections determine for each element to be analyzed both the selection of the internal standard and the time-lag value.

As already specified, all the switches 106 (FIG. 12) are left in their intermediate position.

The terminal 115 of each integrator corresponding to a given element to be analyzed is energized through the medium of the terminal 36 of the control device connected directly through a contact of relay 18 and switch 20 (FIG. 9) to terminal 24, which is connected to the source O.

When the operator depresses the push-button 4 (FIG. 1) the relay 95 (FIG. 12) becomes energized from terminal 108 and is held by its armature and by the terminal 115.

Terminal 109 is energized through terminal 108 and held by 115.

On the other hand, the terminal 34 of the control device is also energized through terminal 109 and therefore held by virtue of the same holding terminal 115. Both relays 15 and 16 (FIG. 9) are energized in succession; when the terminal 108, which has been energized only by a pulse, is no longer energized, both relays 15 and 16 remain energized, the former through terminals 34 and 115, and latter from terminal 24.

On the other hand, as the terminal 8 of the programming device is energized, the energizing current is also fed to terminal 38 of the generator 37 (so as to start the sparking device), to terminal 25 of the pulse control device (so as to lock the relay 13 held through the circuit from terminal 24, which is fed from the source O) and to all the terminals 49 of all the internal-standard integrator devices (even those not used in this operation). This energization causes the operation of all the relays 43 (FIG. 10). Thus, the capacitors 46 are disconnected from the ground and receive through 47 the current from the photocell associated with the line (all the switches 44 of the detectors should be in their intermediate position).

The voltages across the capacitors 46 are transmitted from the terminal 50 of the integrator device to the terminal 60 of the associated detector.

Each time the voltage across the capacitor 46 attains a reference level supplied to terminal 61 of the detector by the reference-voltage supplying device (FIG. 5) via the associated time lag device (from terminal 90 through a contact of the energized relay 83 as shown in FIG. 6, to the terminal 86), the detector releases a pulse to its terminal 59 (see FIG. 4 or FIG. 11). These successive pulses are transmitted respectively to the successive time-lag devices associated with this internal standard (for example the first pulse to device 129, the second pulse to device 130, the third pulse to device 131, and so forth).

Thus, data will appear across the terminals 92 of the successive time-lag devices previously associated with the detector assembly concerned.

(2) Commencement of an Integration

For a given element to be analyzed the integration will begin when a pulse appears on the terminal 117 of its integrator, that is on the terminal 92 of the time-lag device to which this terminal 117 is connected. For the same element, the end of the integration will take place when a pulse appears on the terminal 116 of its integrator, that is, on the terminal 92 of the time-lag device to which this terminal is connected.

For each of the elements to be analyzed that are set in the program the integration capacitor is the capacitor 102 of each device for integrating the element to be analyzed. The sparking is stopped by the termination of the integrating operation of the slowest integrator.

(3) Commencement of Measurement

All the circuits 113—119 of the integrators are connected in series. The first integrator is connected through 118 to the terminal 35 of the control device which is energized at the end of the sparking period, the cycle of measurement begins, the voltage of each integration capacitor 102 inserted in the program is successively read without discharge and transmitted through the chain of terminals 113—119 connected in series.

The assembly is set to its inoperative condition immediately after the last integrator inserted in the program has been measured, the voltage from the control terminal 35 being transmitted through the chain 118—112, etc. . . . to the control terminal 30. Thus relay 18 is energized and the return to the inoperative condition is obtained if the "recycling" switch 19 has not been left in its circuit-closing position. In this case, the cycle of measurement may be recommenced to infinity (the circuit being closed by actuating the push-buttons 20 or 19; in the first case the operation continues for the cycle already commenced, and stops upon completion of this cycle).

The apparatus described would be equally applicable to any measuring system in which different quantities are to be measured with reference to other quantities which vary as a function of time.

Of course, different other modifications and forms of embodiment may be contemplated without departing from the spirit and scope of the invention as set forth in the appended claims.

I claim:

1. An apparatus for the chemical analysis of materials by the spectral method, said apparatus comprising: an analyzer chain including a first plurality of photo-cells for receiving spectral rays emitted by material to be analyzed, switch means constituting a schedule-setting device for selecting any desired combination of the current outputs of said photo-cells, a first integrating means coupled to said device for receiving said selected combination and including means to integrate individually the current outputs of the photo-cells of sad combination; an internal-standard chain including a second plurality of photo-cells for receiving spectral rays emitted from internal-standards, a second integrating means for receiving and individually integrating the outputs of said second plurality of photo-cells; time lag means coupled to and actuated by said second integrating means for initiating the operation of said first integrating means when the integrals of the currents of said second plurality of photo-cells reach pre-determined levels and for terminating the action of said first integrating means when the integrals of the currents of said second plurality of photo-cells reach other pre-determined levels, means for selectively varying said pre-determined levels, means for recording the outputs of said first integrating means, and means for sequentially applying the said outputs to said recording means.

2. An apparatus as claimed in claim 1, and further comprising means for connecting to the input of said recording means a signal representing the value of the current of any one photo-cell of said first and second pluralities.

3. An apparatus as claimed in claim 1, and further comprising means for applying to the input of said recording means a signal representing the integrated value of the current of any one photo-cell of said first and second pluralities.

4. An apparatus as claimed in claim 1, and further comprising selectively operable means for applying to the input of said recording means either a signal representing the value of the current of any selected photo-cell of said first and second pluralities or a signal representing the integrated value of the current of said selected photo-cell.

5. An apparatus for the chemical analysis of materials by the spectral method, said apparatus comprising: an analyzer chain including a first plurality of photo-cells for receiving spectral rays emitted by material to be analyzed, switch means constituting a schedule-setting device for selecting any desired combination of the current outputs of said photo-cells, a first integrating means coupled to said device for receiving said selected combination and including means to integrate individually the current outputs of the photo-cells of said combination; an internal-standard chain including a second plurality of photo-cells for receiving spectral rays emitted from internal-standards, a second integrating means for receiving and individually integrating the outputs of said second plurality of photo-cells; time-lag means coupled to and actuated by said second integrating means for initiating the operation of said first integrating means when the integrals of the currents of said second plurality of photo-cells reach pre-determined levels and for terminating the action of said first integrating means when the integrals of the currents of said second plurality of photo-cells reach other pre-determined levels, and means for selectively varying said pre-determined levels.

6. An apparatus for the chemical analysis of materials by the spectral method, said apparatus comprising: an analyzer chain including a first plurality of photo-cells for receiving spectral rays emitted by material to be analyzed, switch means constituting a schedule-setting device for selecting any desired combination of the current outputs of said photo-cells, a first integrating means coupled to said device for receiving said selected combination and including means to integrate individually the current outputs of the photo-cells of said combination; an internal-standard chain including a second plurality of photo-cells for receiving spectral rays emitted from internal-standards, a second integrating means for receiving and individually integrating the outputs of said second plurality of photo-cells, and time-lag means coupled to and actuated by said second integrating means for initiating the operation of said first integrating means when the integrals of the currents of said second plurality of photo-cells reach pre-determined levels and for terminating the action of said first integrating means when the integrals of the currents of said second plurality of photo-cells reach other pre-determined levels.

References Cited in the file of this patent

UNITED STATES PATENTS

| | | |
|---|---|---|
| 2,436,104 | Fisher et al. | Feb. 17, 1948 |
| 2,480,636 | Dieke | Aug. 30, 1949 |
| 2,541,877 | Machler | Feb. 13, 1951 |
| 2,572,119 | Dieke | Oct. 23, 1951 |
| 2,577,814 | Saunderson et al. | Dec. 11, 1951 |
| 2,675,734 | Hasler et al. | Apr. 20, 1954 |
| 2,706,928 | Lee et al. | Apr. 26, 1955 |
| 2,735,330 | Polster | Feb. 21, 1956 |

FOREIGN PATENTS

| | | |
|---|---|---|
| 1,152,273 | France | Sept. 2, 1957 |